United States Patent [19]
Mardon et al.

[11] Patent Number: 5,702,544
[45] Date of Patent: Dec. 30, 1997

[54] ZIRCONIUM-BASED ALLOY TUBE FOR A NUCLEAR REACTOR FUEL ASSEMBLY AND A PROCESS FOR PRODUCING SUCH A TUBE

[75] Inventors: Jean-Paul Mardon, Caluire; Jean Sevenat, Saint-Brevein-les-Pins; Daniel Charquet, Ugine Cédex, all of France

[73] Assignees: Framatome; Compagnie Generale Des Matieres Nucléaires, both of, France

[21] Appl. No.: 593,869

[22] Filed: Jan. 30, 1996

[30] Foreign Application Priority Data

Jan. 30, 1995 [FR] France .................. 95 01026

[51] Int. Cl.$^6$ .................................................. C22F 1/18
[52] U.S. Cl. .................................................. 148/672
[58] Field of Search .................................................. 148/692

[56] References Cited

U.S. PATENT DOCUMENTS

| | | | |
|---|---|---|---|
| 5,023,048 | 6/1991 | Mardon et al. | 376/416 |
| 5,242,515 | 9/1993 | Worcester et al. | 148/672 |
| 5,266,131 | 11/1993 | Foster et al. | 148/672 |

FOREIGN PATENT DOCUMENTS

| | | | |
|---|---|---|---|
| 0085553 | 8/1983 | European Pat. Off. | |
| 0622470 | 11/1994 | European Pat. Off. | |
| 6-49608 | 2/1994 | Japan | 148/672 |
| 6-279963 | 10/1994 | Japan | 148/672 |
| 0 196 286 A1 | 10/1986 | WIPO | 148/672 |
| 0 446 924 A1 | 9/1991 | WIPO | 148/672 |

OTHER PUBLICATIONS

Patent Abstracts of Japan, vol. 014 No. 513(C–0777), Nov. 9, 1990 & JP–A–02 312437 (Nippon Nuclear Fuel Dev. Co. Ltd), Nov. 1990.

*Primary Examiner*—John Sheehan
*Attorney, Agent, or Firm*—Pollock, Vande Sande & Priddy

[57] ABSTRACT

A tube for constituting all or part of a cladding or guide tube for a fuel assembly is made from an alloy containing, by weight, 1.4% to 0.6% of tin, 0.5% to 0.8% of iron, 0.35% to 0.50% of vanadium, and 0.10% to 0.18% of oxygen, 100 ppm to 180 ppm of carbon and 50 ppm to 120 ppm of silicon. The alloy contains nothing else apart from zirconium and unavoidable impurities and it is completely recrystallized.

7 Claims, 1 Drawing Sheet

ZIRCONIUM-BASED ALLOY TUBE FOR A NUCLEAR REACTOR FUEL ASSEMBLY AND A PROCESS FOR PRODUCING SUCH A TUBE

BACKGROUND OF THE INVENTION

The present invention concerns zirconium-based alloy tubes for use in nuclear reactor fuel assemblies. Tubes of this type are usable, in particular, for constituting fuel rod cladding, to form the external portion of such cladding, or to form guide tubes which receive the rods of a control cluster.

Sleeves of this type are frequently constituted by tubes made from an alloy known as "Zircaloy 4" which contains, in addition to zirconium, 1.2% to 1.7% by weight of tin, 0.16% to 0.24% by weight of iron, 0.07% to 0.13% by weight of chromium and 0.10% to 0.16% by weight of oxygen. A number of alloys which are derived from those previous alloys have also been proposed, in particular alloys in which the chromium is either completely or partially replaced by vanadium and/or in which the oxygen content exceeds that given above, with a corresponding reduction in the contents of some of the other additive elements.

Particular qualities which are required in a tube for use as cladding are good resistance to corrosion by water at high pressure and at high temperature, limited long term creep, long term retention of mechanical properties, and limited swelling on irradiation. These properties must, in addition, be reproducibly obtainable and the alloy must have metallurgical properties at the various production stages (in particular rollability) which keeps the rejection rate down to an acceptable value.

SUMMARY OF THE INVENTION

In order to achieve these results, there is provided a zirconium-based alloy tube containing, by weight, 0.4% to 0.6% of tin, 0.5% to 0.8% of iron, 0.35% to 0.50% of vanadium, and 0.10% to 0.18% of oxygen, the carbon and silicon contents being controlled and being respectively in the range 100 to 180 parts per million (ppm) to and in the range of 50 ppm to 120 ppm, the balance being zirconium and unavoidable impurities, and the tube, in its final state, being completely recrystallized. The vanadium is essentially present as fine precipitates in the form $Zr(Fe,V)_2$.

The precise composition selected from the above range will depend on the properties which are to be prioritized. Generally advantageous contents are 0.4% to 0.6% of tin, 0.6% to 0.7% of iron, 0.37% to 0.43% of vanadium, 0.10% to 0.14% of oxygen, 120 ppm to 160 ppm of carbon and 85 ppm to 115 ppm of silicon. Normally, an alloy containing 0.5% Sn, 0.65% Fe, 0.4% V, 0.12% $O_2$, 140 ppm C and 100 ppm Si will constitute a good compromise.

In all cases, the presence of vanadium instead of the chromium which is currently used reduces the fraction of absorbed hydrogen and improves corrosion resistance in an aqueous medium at high temperature and high pressure, even in the event of localized boiling.

It should be noted that those skilled in the art had a prejudice against the use of alloys containing more than 0.25% of vanadium to constitute tubes (EP-A- 0 301 295).

If the main requirement is to reduce creep as much as possible during the initial phase of use in a reactor, it may be advantageous to increase the tin, the carbon and/or the oxygen content. The carbon content is adjusted so as to be greater than 100 ppm, which is favorable as regards creep, and less than 180 ppm, above which swelling on irradiation becomes too great. The silicon content is "controlled" to take advantage of its regulatory effect on structures and its favorable influence on corrosion resistance. Below 50 ppm, the corrosion kinetics increase substantially. Above 120 ppm, they increase again. Further, with a content of more than 120 ppm, silicide type compounds appear which are detrimental to the aptitude to hot forming. The recrystallized nature of the alloy contributes to its good creep behavior.

A high Fe/V ratio, of more than 2/1, further increases corrosion resistance in a medium containing lithium.

A high value for the sum Fe+V contributes to refining the metallurgical grain structure, which is a factor in good resistance to corrosion under stress.

The invention also provides a process for the production of an alloy tube of the type defined above, comprising successively: casting an ingot; forging it into a solid bar; water quenching the bar after it has been heated into β phase; optionally annealing in the range 640° C. to 760° C. to form the α phase; drawing a billet pierced to a tubular blank; optionally annealing in the range 640° C. to 760° C. into α phase; successive cold rolling steps to form tubes of decreasing thicknesses, with intermediate annealing steps in an inert atmosphere or in a vacuum at a temperature in the range 640° C. to 760° C., advantageously about 730° C. for the first two steps and 700° C. for subsequent steps; and finally recrystallization annealing in an inert atmosphere or in a vacuum at a temperature in the range 560° C. to 650° C. (advantageously in the range 565° C. to 595° C., in particular at about 580° C.), the set of heat treatments being such that the heat treatment parameter ΣA is in the range $10^{-18}$ to $10^{-16}$, ΣA being equal to the product of time t in hours multiplied by exp (−40000/T), the temperature T being expressed in Kelvin.

The first annealing step, after quenching, is advantageously carried out at 730° C.; the second, after drawing, is advantageously carried out at about 700° C.

The tube produced does not undergo any further heat treatment modifying its metallurgical structure until it is used as a cladding tube or a guide tube. However, it may undergo further surface treatment and it is then examined. The surface treatment may in particular comprise blast cleaning and oxide film removal followed by rinsing. The surface treatment can be completed by polishing using a wheel. It is checked in a conventional manner, either visually, and/or ultrasound and/or using eddy currents.

Other features will become clearer from the following description with reference to the accompanying drawings.

DETAILED DESCRIPTION

The following composition, which was used in the tests whose results are shown below, was shown to be of interest:

tin: 0.5% iron: 0.65% vanadium: 0.4% oxygen: 0.12% (which can be raised to 0.14% when resistance to creep is essential)

carbon: 140 ppm (to improve resistance to creep)

silicon: 100 ppm the other components being zirconium and impurities.

The contents given above are set values.

For this nominal composition, manufacturing tolerances and variations in composition within an ingot produce values which always remain within the advantageous range given above.

The starting alloy was in the form of an ingot. It was formed into a bar by forging or rolling and, after heating to the β phase, was water quenched at a controlled rate to bring it into the α region, for example cooling at a rate in the range 5° C. per second to 30° C. per second until the temperature was less than about 800° C. After quenching, annealing was effected at a temperature of less than 800° C. to bring the bar into the α phase and keep it therein. Drawing was carried out after machining a tubular billet and heating to between 600° C. and 700° C. The drawn blank, after possibly undergoing annealing at a temperature of less than 800° C., then underwent the required number of successive cold rolling steps to bring it to the required thickness, with intermediate annealing steps carried out in argon, to produce a suitable ΣA. Finally, a final recrystallization heating step was carried out in an inert atmosphere, at about 580° C.

Tests were carried out on tubes 10 produced to compare them with tubes formed from alloys which fell within the category of Zircaloy 4, i.e., alloys which are generally used in a stress-relieved state.

Uniform corrosion

Corrosion tests were carried out over three irradiation cycles in a pressurized water reactor until a specific burn-up of 40 GW-days per (metric) ton showed a gain of at least 30% relative to the Zircaloy 4 used previously. Subsequent examination in a hot cell showed no heterogeneous or localized corrosion.

Corrosion in the presence of lithium

Figure 1:
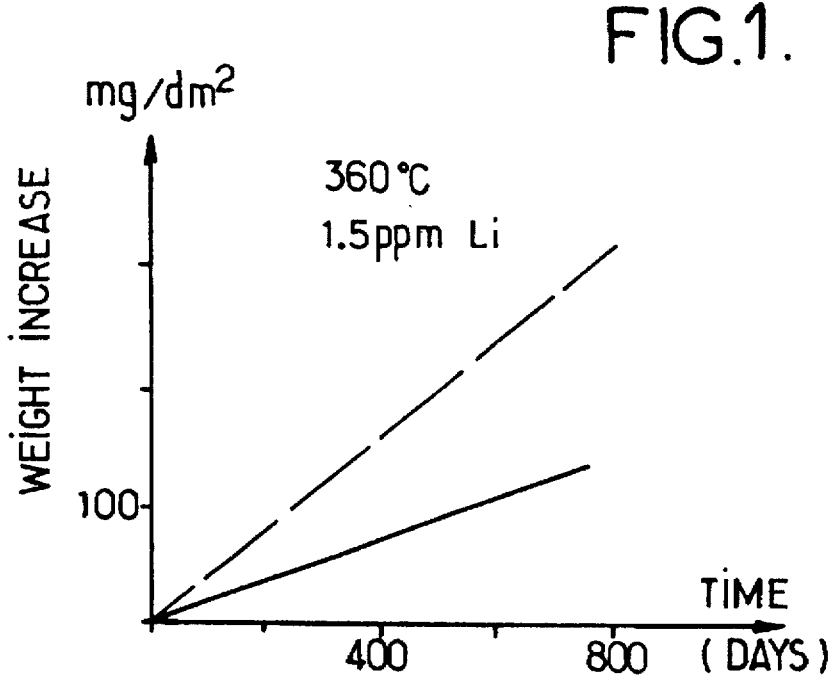
FIGS. 1 and 2 are graphs showing change in oxidation responsive to exposure time.
Figure 2:
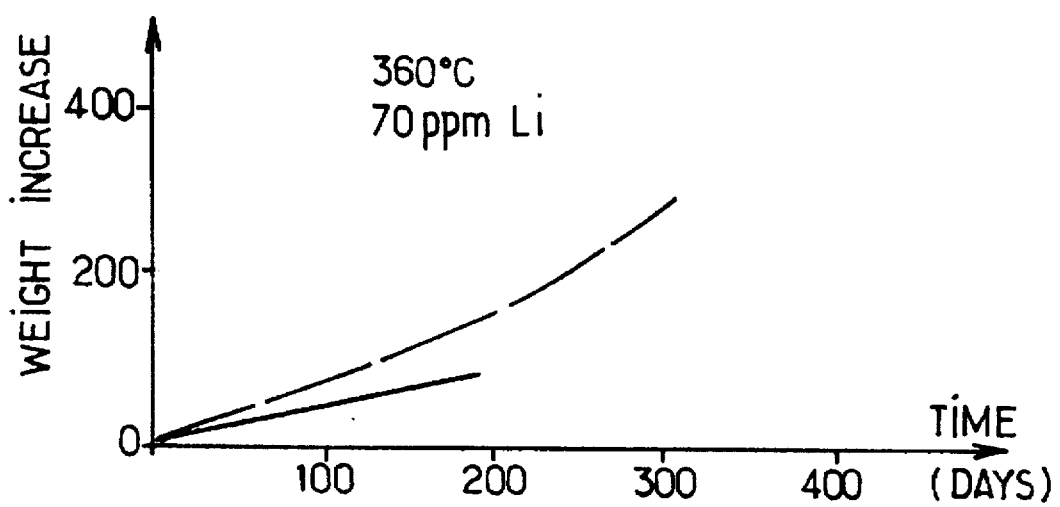

FIGS. 1 and 2 show the results of tests carried out in an autoclave at 360° C., for lithium contents of 1.5 ppm and 70 ppm. The broken line curve shows the increase in weight of a Zircaloy 4 type alloy. The solid line curve gives the increase in weight of an alloy in accordance with the invention. It can be seen that the corrosion kinetics are much slower.

Resistance to hydriding

Tests were carried out in a hot cell on cladding tubes after irradiation over two pressurized water reactor cycles. After irradiation of 26 GW-days per (metric) ton, the hydrogen contents were 91 ppm and 99 ppm for the alloy in accordance with the invention, and 148 ppm for the Zircaloy 4 alloy used as a reference.

Mechanical propertie—ductility

Tests showed that the mechanical strength of the alloy was very slightly lower than that of a Zircaloy 4 alloy until the burn-up reached the equivalent of one irradiation cycle. After two irradiation cycles, the mechanical strength was equivalent or even slightly higher for the alloy of the invention.

The total lengthening of the alloy of the invention when subjected to a tractive force, which represents ductility, always remained equal to or greater than that of the Zircaloy 4.

Behavior in the presence of iodine

The susceptibility of the alloy of the invention to stress corrosion in the presence of iodine was shown to be zero, while Zircaloy 4 suffered damage both in the recrystallized state and in the stress-relieved state.

In summary, the alloy of the invention brings a substantial improvement in uniform corrosion resistance and especially a low sensitivity to lithium; it has been proved to have a remarkable resistance to stress corrosion; and it retains high ductility after several irradiation cycles.

We claim:

1. A method for the production of a zirconium-based alloy tube constituting at least part of cladding or guide tube for a nuclear fuel assembly, said alloy containing, by weight, 0.4% to 0.6% of tin, 0.5% to 0.8% of iron, 0.35% to 0.75% of vanadium, 0.10% to 0.18% of oxygen, 100 ppm to 180 ppm carbon and 50 ppm to 120 ppm silicon, the balance being zirconium and unavoidable impurities, said method comprising the steps of:

(a) casting an ingot of said alloy;

(b) forging said ingot into a solid bar;

(c) heating said bar and quenching the heating bar into β phase;

(d) piercing said bar into a hollow billet and drawing said billet into a tubular blank;

(e) carrying out a plurality of successive cold rolling steps of said tubular blank to form successive tubes of decreasing thicknesses, with intermediate heat treatments between said cold rolling steps in an inert atmosphere or in a vacuum at a temperature in a range of 640° C. to 760° C.; and (f) finally, recrystallizing the tube resulting from step (e) in an inert atmosphere or under vacuum at a temperature in the range of 550° C. to 650° C.;

(g) steps (a) to (f) as a whole being such that a heat treatment parameter ΣA is in the range $10^{-18}$ to $10^{-16}$.

2. A method according to claim 1, wherein two first said heat treatments of step (e) are at a temperature of about 730° C. and the subsequent treatments are at about 700° C.

3. A method according to claim 1, wherein step (f) is carried out in the range 565° C. to 595° C.

4. A method according to claim 1, further including an annealing step in the range 640° C. to 730° C. after step (b).

5. A method according to claim 1, further including an annealing step into a phase at α temperature between 640° and 760° C. between steps (c) and (d).

6. A method according to claim 5, wherein the annealing step is carried out at about 730° C.

7. A method for the production of a zirconium-based alloy tube constituting at least part of a cladding or guide tube for a nuclear fuel assembly, said alloy containing, by weight, 0.4% to 0.6% of tin, 0.6% to 0.7% of iron, 0.37% to 0.43% of vanadium, 0.10% to 0.14% of oxygen, 120 ppm to 160 ppm carbon and 85 ppm to 115 ppm silicon, a balance being zirconium and unavoidable impurities, said method comprising the steps of:

(a) casting an ingot of said alloy;

(b) forging said ingot into a solid bar;

(c) heating said bar and quenching the heated bar into β phase;

(d) piercing said bar into a hollow billet and drawing said billet into a tubular blank;

(e) carrying out a plurality of successive cold rolling steps of said tubular blank to form tubes of decreasing thicknesses, with intermediate heat treatments between said cold rolling steps in an inert atmosphere or in a vacuum at a temperature in a range of 640° C. to 760° C. until a final tube is obtained; and (f) recrystallizing said final tube in an inert atmosphere or under vacuum at a temperature in a range of 550° C. to 650° C.;

(g) said steps as a whole being such that a heat treatment parameter ΣA is in a range of $10^{-18}$ to $10^{-16}$.

* * * * *